Dec. 22, 1942.   A. CRAVARITIS ET AL   2,305,678
LEVEL
Filed April 26, 1941
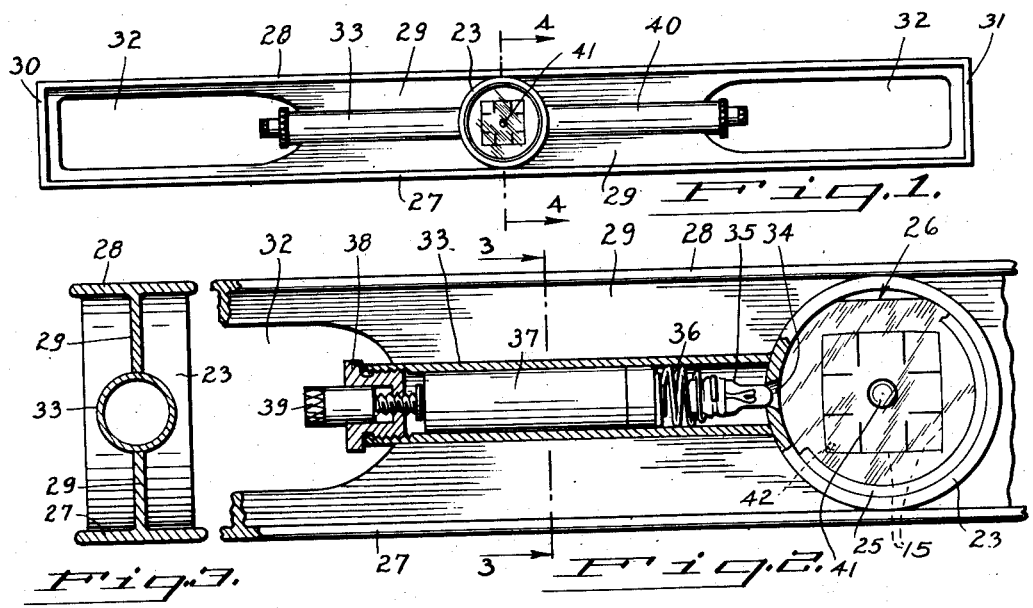
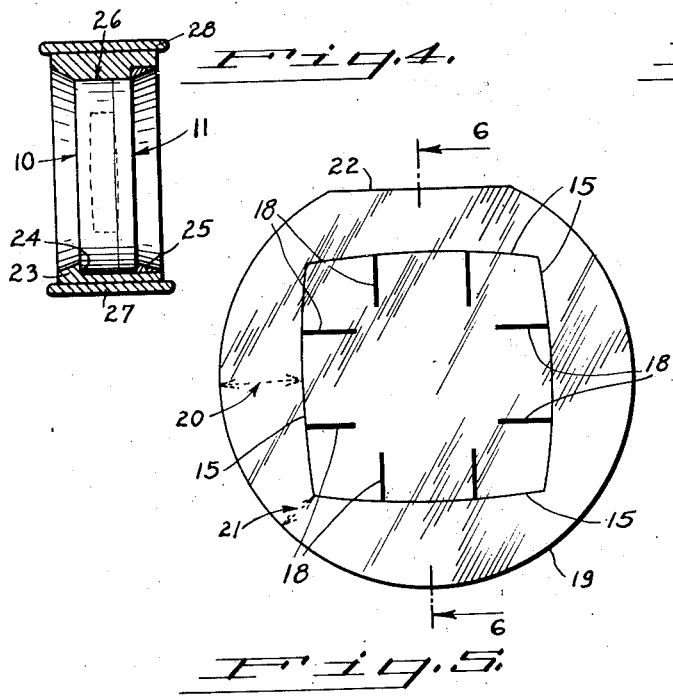
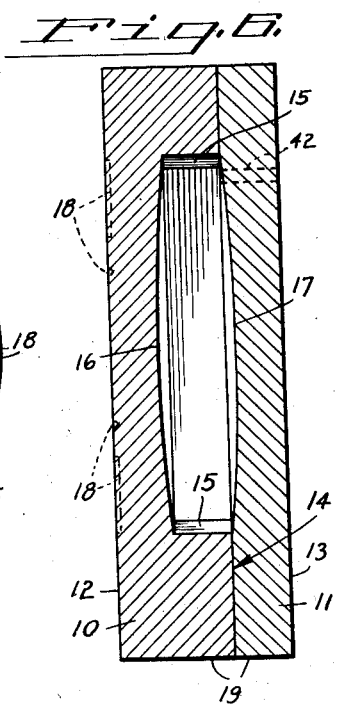
INVENTOR.
ANDREW CRAVARITIS &
PETER KARLSSON
BY Gluck Breitenfeld
ATTORNEYS Patented Dec. 22, 1942

2,305,678

UNITED STATES PATENT OFFICE 2,305,678

LEVEL

Andrew Cravaritis and Peter Karlsson, New York, N. Y., assignors to National Silver Deposit Ware Co., Inc., New York, N. Y., a corporation of New York Application April 26, 1941, Serial No. 390,442

6 Claims. (Cl. 33—211)

Our present invention relates generally to levels.

As is well known, the so-called "carpenter's level" consists essentially of a hollow transparent body adapted to accommodate a liquid within which there is a freely movable level indicator such as a bubble or ball. It is a general object of the present invention to provide certain improvements in a transparent body of this kind.

As compared with the conventional type of level, a device constructed in accordance with the present invention is not only simpler and more rugged in structural nature, but easier to manufacture, easier to use, and attractive in appearance.

Furthermore, a level of the present improved type is unusually suited for association with a special illuminating means, such as a lamp, thereby permitting use of the device in relatively dark places.

Briefly, our improved level consists of a transparent body having substantially smooth front and back faces and provided with an interior cavity of substantially rectangular contour, preferably square. The cavity is adapted to accommodate the usual liquid within which a level indicator is freely movable. The relative position of the level indicator with respect to any one of the four peripheral walls of the cavity or with respect to the bottom or top wall of the cavity, serves as a means for testing horizontals and verticals, and extended horizontal planes, in a manner well known per se.

A particular feature of the present invention lies in so designing the device that the peripheral wall of the transparent body has a substantial thickness that is conducive to internal reflections of light rays entering the body through its peripheral face.

Another feature of our invention lies in the combination with a transparent body of the foregoing general character, of an electric lamp, and means for directing a beam of light from the lamp into the body through its peripheral face.

A further feature of our invention lies in providing suitable guide markings on at least one of the opposite outer faces of the transparent body, these markings being arranged in predetermined positional relationship to the walls of the cavity and serving as reference markings against which the position of the level indicator may be observed.

While certain phases of our invention do not require that the transparent body be composed of any special material, it is particularly advantageous to use a moldable material, and to form the guide markings and the cavity by molding the same into the body whereby an accurate predetermined relationship between the markings and the walls of the cavity is always assured.

The material which we prefer to use is the transparent unbreakable plastic available on the market today under the trade name "Lucite." This material is particularly advantageous because of its excellent light-refracting properties, because it may be readily molded to desired shapes, and because the resultant shapes or bodies have uniform density and transparency. It will be understood that the invention is not restricted to this particular material, and that any other material having equivalent properties may be used. Ordinary glass, however, has proven unsuitable because its transparency is not uniform, especially when it is molded.

In the preferred construction, the transparent body is composed of separate segments that are retained in abutting relationship by suitable cement or other fastening means, the inner faces of the segments conjointly defining the walls of the cavity. A convenient construction involves the use of two segments, one of which is substantially cup-shaped, the inner face of this segment defining not only the peripheral walls but also the bottom wall of the cavity; the other segment being complementary in character.

Other features of our invention lie in a simplified and otherwise improved association of the transparent body with a suitable housing, the housing being provided with at least one relatively extended testing surface. In a preferred construction, the housing is provided in an unusually efficient manner with an improved illuminating means by means of which light rays from an electric lamp or lamps may be directed into the transparent body through its peripheral face.

We achieve the foregoing objects, and such other objects as may hereinafter appear or be pointed out, in the manner illustratively exemplified in the accompanying drawing in which:

Figure 1 is an elevational view of a preferred embodiment of the invention;

Figure 2 is an enlarged view, partly in cross-section, through a portion of the device of Figure 1;

Figure 3 is a cross-sectional view taken substantially along the line 3—3 of Figure 2;

Figure 4 is an enlarged cross-sectional view taken substantially along the line 4—4 of Figure 1;

Figure 5 is a front view of the transparent body by itself; and

Figure 6 is an enlarged cross-sectional view taken substantially along the line 6—6 of Figure 5.

Referring for the moment to Figures 5 and 6, it will be observed that we have shown a transparent body composed of two parts or segments 10 and 11. The outer faces 12 and 13 are smooth and polished, and we have illustratively shown each of these faces conforming to a plane surface. The segments 10 and 11 have annular inner faces 14 that are adapted to be brought into abutting relationship. The segments are retained in this abutting relationship by means of a suitable cement or other fastening means so that there may be formed a single resultant transparent body having smooth front and back faces 12 and 13.

The inner faces of the segments 10 and 11 are so configured that an internal cavity of substantially rectangular contour is formed within the transparent body. This cavity is preferably substantially square in shape, and in the preferred construction the peripheral walls 15, as well as the bottom wall 16, are formed on the inner face of the cup-shaped segment 10, while the top wall 17 is defined by the inner face of the segment 11.

Each of the walls 15 is very slightly concaved, as indicated in the present drawing, although it will be understood that the concavities shown in the present figures are considerably exaggerated. The bottom and top walls 16 and 17 of the interior cavity may also be advantageously concaved by a slight amount, as indicated in an exaggerated manner in Figure 6.

On at least one of the outer faces 12 and 13 we provide suitable guide markings positioned in predetermined relation to the walls of the interior cavity. We have illustratively shown these markings on the face 12 in the form of two substantially parallel lines 18 extending in a transverse direction, at equal distances from the center, with respect to each peripheral wall 15 of the cavity.

The segment 10 is preferably composed of moldable material so that the markings 18 and the walls 15 and 16 may be molded in the element 10, thus assuring proper predetermined relationship of these parts. The segment 11 is preferably composed of the same material and also molded, and the two segments are preferably united by adhesive means because an integral completely-transparent body may thus be produced.

In accordance with our invention, at least a portion of the peripheral face of this transparent body is of smoothly convex curvature. In the illustrated construction this face is of substantially circular contour and is designated by the reference numeral 19. The provision of an interior cavity of substantially rectangular contour within a body having a peripheral face of substantially circular contour provides a peripheral wall that is of substantial thickness. This thickness is not necessarily uniform throughout, being greater in the region 20, for example, than in the region 21. Nevertheless, it is sufficient to produce desirable internal reflections of light rays entering the body through the peripheral face 19.

For a purpose presently to be described, a portion of the face 19 is made substantially flat as at 22. This flat region is formed at a predetermined angularity to the testing axis of the cavity, and we have illustratively shown the flat portion 22 in substantially parallel relation to the upper peripheral wall 15 of the cavity as viewed in Figure 5.

The housing within which the transparent body is mounted consists essentially of a frame 23 having a shape corresponding to the contour of the transparent body. The body may be mounted in this frame in any suitable manner, and we have illustratively shown a shoulder 24 against which the transparent body is pressed, a ring 25 serving to support the transparent body from the opposite side. Where the body is substantially circular, it is prevented from rotating by interengaging portions formed on the body and the housing respectively. The flat surface 22 is an example of one such portion, there being a corresponding flat surface 26 in the housing 23.

Associated with the housing is at least one relatively extended testing surface. In the illustrated device, we have shown two such testing surfaces 27 and 28. The illustrated device is composed of metal, and these testing surfaces may therefore assume the form of flanges arranged at the opposite ends of a connecting web 29.

As will be observed from Figure 3, each of the testing surfaces 27 and 28 has parallel longitudinal edges, these edges defining an over-all cross-section that is substantially rectangular.

At the ends of the device there are two transverse walls 30 and 31, preferably formed as continuations of the flanges 27 and 28.

Large recesses or openings 32 are preferably formed in the connecting web 29 adjacent to the ends 30 and 31.

Needless to say, the flat surface 26 is formed in the housing at a predetermined angularity to the testing surfaces carried by the housing, so that when the transparent body is mounted in the housing its testing axis will be at an accurately predetermined angle to these testing surfaces.

In the preferred embodiment of the invention, as illustrated in the present drawing, we provide at least one tubular chamber 33 for the purpose of accommodating an electric lamp and battery. This chamber is arranged in parallel relation to the testing surfaces 27 and 28 and is disposed in its entirety within the confines of the space bounded by the parallel longitudinal edges of the testing surfaces.

At the forward end of the tube 33 there is an opening 34 which communicates with the peripheral face of the transparent body that is mounted in the housing. An electric lamp 35 is arranged in the chamber 33 with its forward end projecting slightly into the opening 34. The lamp may be associated with a battery in any suitable manner and we have illustratively shown the lamp secured within the forward end of a coiled spring 36 which bears against the lateral terminal of a battery cell 37 snugly fitted within the tube 33. In the rear end of the tube there is a removable screw-threaded cap 38. When this cap is removed, the battery and the lamp can be withdrawn rearwardly from the chamber 33, for replacement or inspection purposes.

Mounted in the cap 38 is a switch member 39 which we have shown in the form of a rotatable knob whose forward end is in screw-threaded relation to the forward portion of the cap 38. When the knob 39 is rotated in one direction, its advancement relative to the cap 38 results in pressing upon the rear end of the battery 37 and advancing the latter forwardly until the central terminal of the battery contacts the corresponding terminal of the lamp 35. This causes the lamp to operate and to cast its rays forwardly through the opening 34 into the peripheral face of the transparent body.

When the handle or switch element 39 is rotated in the opposite direction, it allows the spring 36 to press the battery 37 rearwardly to a sufficient extent to extinguish the lamp.

For the sake of symmetry, and for the benefit of the added illumination that may be afforded, a similar tubular chamber 40 is preferably arranged on the opposite side of the transparent body, and it will be understood that the lamp and battery assembly in this chamber are similar to those hereinbefore described.

By virtue of the relatively thick peripheral wall of the transparent body, light rays entering it through the peripheral face 19 serve to illuminate the entire body. This is due to the fact that some of the rays will pass through the body by internal reflection. As a result, the level indicator 41 is efficiently illuminated, thus allowing the level to be used in places where an insufficiency of light would make the normal unilluminated level difficult to use.

The illumination of the level indicator is unusually effective because of the fact that the light rays reach the indicator not from an outside source nor solely through the wall of the cavity, but also through the liquid itself. The refractions and reflections that are thus caused to take place at the surface of the level indicator itself are uniquely effective in bringing about a useful illumination of the desired character.

When the device is initially manufactured, it is contemplated that the segments 10 and 11 will first be adhesively united to form the hollow transparent body and that the desired liquid will thereafter be introduced to the interior cavity 40 through a small opening 42 through one of the walls of the body. This opening is subsequently sealed, after the desired quantity of liquid has been introduced.

By controlling the amount of liquid, the level indicator can be made to consist of the usual air bubble. It is within the purview of our invention, however, to provide the level indicator in the form of a solid body, and where such a level indicator is employed, it is obviously introduced into the cavity before the segments of the transparent body are united.

It will be observed that the present device provides a single instrumentality for testing not only horizontals and verticals but also extended horizontal surfaces. That is, the level may be used in the position shown in Figures 1 and 2; or it may be used with one or the other of the testing surfaces 27 and 28 in contact with a substantially vertical wall or surface; or it may be laid flat. In each of the former cases, the level indicator will assume a significant relation to one of the peripheral walls 15 of the cavity. In the latter case, however, the level indicator will assume a significant relation to one of the walls 16 and 17. When the level is laid flat, and the level indicator is in the exact center of one of the walls 16 and 17, it is an indication that the extended surface upon which the level is resting is truly horizontal.

It will be understood that the present level may be used either with or without an illuminating means, and if special illumination is provided for, it may consist of one or more lamp units of the character herein shown.

It will also be understood that the housing, though preferably composed of metal, may be formed of any other desired material, and may include either one or more testing surfaces, depending upon requirements.

The transparent hollow body, while preferably of substantially circular contour, may partake of various other similar configurations. And while the opposite faces of the transparent body are preferably plane and substantially parallel, as shown in the present drawing, it will be understood that they may under certain circumstances be slightly convexed.

In general, it will be understood that those skilled in the art may make changes in the details herein described and illustrated without departing from the spirit and scope of the invention as expressed in the appended claims. It is, therefore, intended that these details be interpreted as illustrative, and not in a limiting sense.

Having thus described our invention and illustrated its use, what we claim as new and desire to secure by Letters Patent is:

1. In a level, a transparent body having smooth front and back faces and provided with an interior cavity of substantially rectangular contour, said cavity accommodating a liquid within which a level indicator is freely movable, the peripheral wall of said body having a substantial thickness that is conducive to internal reflections of light rays entering said body through its peripheral face, said peripheral face being of circular contour whereby the peripheral wall is of substantial thickness conducive to internal reflections of light rays entering said body through said peripheral face.

2. In a level, a transparent body having smooth front and back faces and provided with an interior cavity of substantially rectangular contour, said cavity accommodating a liquid within which a level indicator is freely movable, said body being formed of separate abutting segments whose inner faces conjointly define the walls of said cavity, one of said segments being composed of molded material and being cup-shaped so that its inner face defines the peripheral walls and the bottom wall of said cavity, and guide markings molded in the outer face of said segment in predetermined relation to the walls of said cavity.

3. In a level, the combination with the transparent body set forth in claim 1, of a housing within which said body is mounted, at least one relatively extended testing surface carried by said housing, and means securing said body in position with its testing axis at an accurately predetermined angle to said testing surface, said means comprising interengaging portions formed on said body and in said housing respectively.

4. In a level, the combination with the transparent body set forth in claim 1, of a housing within which said body is mounted, at least one relatively extended testing surface carried by said housing, and means securing said body in position with its testing axis at an accurately predetermined angle to said testing surface, said means comprising a flat bearing surface formed in the housing at a predetermined angularity relative to said testing surface, said body having a corresponding flat surface formed on its periphery at a corresponding predetermined angularity relative to the walls of said rectangular cavity.

5. In a level, the combination with the transparent body set forth in claim 1, of a housing within which said body is mounted, said housing engaging the periphery of said body so that said front and back faces are exposed to view, at least one relatively extending testing surface carried by said housing and having parallel longitudinal edges, a tubular chamber carried by the housing in parallel relation to said testing surface and disposed in its entirety within the confines of the space bounded by said parallel longitudinal edges, said chamber being provided with an opening communicating with the peripheral face of said body, an electric lamp mounted in said tubular chamber so that its rays will pass through said opening, and a battery and switch means in the rear portion of said tubular chamber.

6. In a level, a substantially circular transparent body having smooth front and back faces and provided with an interior cavity of substantially rectangular contour, said cavity accommodating a liquid within which a level indicator is freely movable, the peripheral wall of said body being of substantial thickness that is conducive to circumferential light transmission therethrough, and means for directing a beam of light through the peripheral face of said body intermediate the length of one of the sides of the rectangular cavity for illumination of the body and the liquid therein.

ANDREW CRAVARITIS.
PETER KARLSSON.